Patented Dec. 9, 1924.

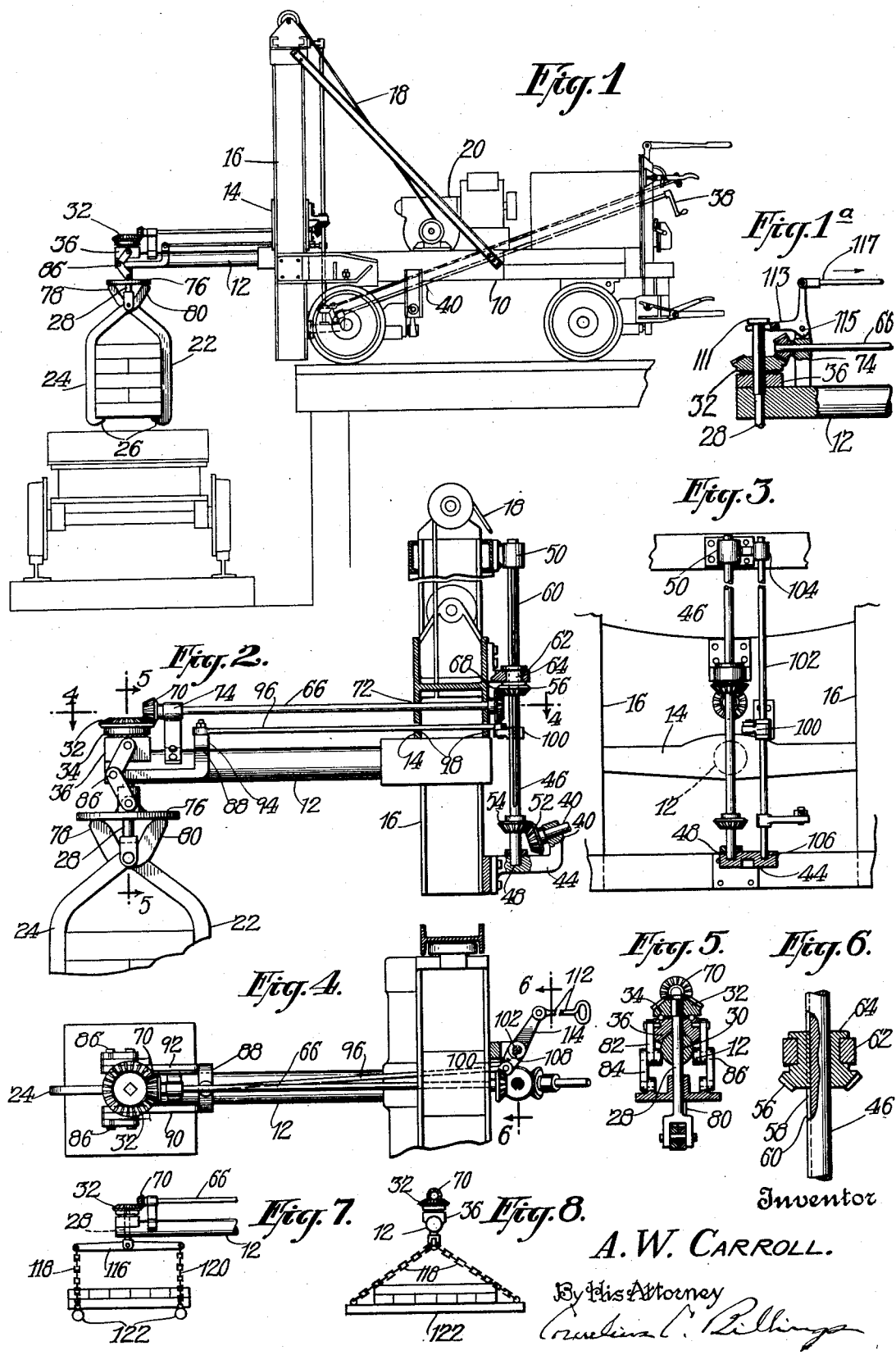

1,518,560

UNITED STATES PATENT OFFICE.

ALEXANDER W. CARROLL, OF ELIZABETH, NEW JERSEY.

LOADING APPARATUS.

Application filed May 31, 1923. Serial No. 642,551.

*To all whom it may concern:*

Be it known that I, ALEXANDER W. CARROLL, a citizen of the United States, and a resident of Elizabeth, county of Union, and State of New Jersey, have invented certain new and useful Improvements in Loading Apparatus, of which the following is a specification.

This invention relates to a loading apparatus and, more particularly to an apparatus for loading masses or objects, such as copper wire bars, wedge bars ingots and similar products into and from railway cars.

In the handling of these materials in copper refineries it is necessary in building a stable load and convenient for efficient operation to pile or load the articles on industrial trucks in successive layers with the objects in one layer lying crosswise of those in the immediately adjacent layers. In loading the bars from the industrial truck into a box car, the bars are picked up manually or in a sling and transferred to a hand truck within the box car. This is then wheeled to the ends of the car or of the loaded bars, and dumped, thus piling the bars parallel to each other crosswise of the car. In unloading, the bars are picked up by a hand truck, wheeled to an industrial truck and again piled in crosswise layers for stability in moving and convenience in handling in the works. This old method of handling requires much manual labor and consumes considerable time.

One of the objects of the present invention is to provide a method of more simply and rapidly transferring articles into and from a car which will permit of their handling by mechanical means.

Another object of the invention is to provide a mechanism by which bars or other masses may be taken in large numbers in the order or arrangement in which they are supplied and may be transferred in this order or arrangement to a car or other transportation unit.

Further objects and features of the invention are to provide a mechanism or apparatus, which may be mounted on a ram or equivalent carrying element of a truck of the ram type, for example, by which the bars may be taken up and carried, to provide mechanism by which the carrying means may be rotated to any desired position and to provide a mechanism by which the bars being carried may be released. Other objects are to provide a control means for the gripping or carrying elements which is convenient to the operator of the truck.

With these and other objects in view, the invention comprises the method and apparatus described and set forth in the following specification and claims.

The various features of the invention are illustrated in, and in connection with, the accompanying drawings in which:

Fig. 1 is a side view of a truck provided with a carrying mechanism embodying a form of the invention, Fig. 1ª is a detail view of a modified lifting means.

Fig. 2 is a side view partly in section of the ram and guides of the truck shown in Fig. 1 and of the carrying means embodying one form of the invention.

Fig. 3 is an end view of the ram, guides and control mechanism of the carrying means taken from the operator's end of the truck.

Fig. 4 is a top view of the ram and carrying mechanism,

Fig. 5 is a cross sectional view taken on the line 5—5 of Fig. 2.

Fig. 6 is a vertical view of a portion of the control mechanism taken on line 6—6 of Fig. 4.

Fig. 7 is a side view of a modified form of carrying device, and,

Fig. 8 is a view at right angles to the view of Fig. 7.

In my present invention one or more layers of bars or other masses of metal are lifted from a conveniently placed industrial truck and carried without further handling to the desired place in the car or other transportation unit, turned to the proper position for piling and lowered into position. When the car is to be unloaded, the layers are similarly picked up and transferred in a single handling to an industrial truck which may be unloaded for storage at a distant point. When it is desired to pile the bars in the usual manner crosswise in the car so that they may be unloaded at their destination by a hand truck in the usual manner, this may be done by picking up one layer at a time and swinging it to the proper position in the car before unloading the bars.

In carrying on this method of loading and unloading, I prefer to use an electric truck having a ram projecting from the end opposite the operator's or driver's platform and having means controlled by the operator for elevating or lowering the ram. The layers or bars are taken up and carried at the outer end of the ram by a pair of tongs or a sling or other device mounted on a vertical turning device such as a shaft. This shaft is rotatably mounted on a suitable saddle support on the ram and is rotatable on the saddle by means of gearing carried on the ram and manipulated by the operator through a shaft carrying a sliding gear which rises and falls with the ram. A release or dumping device is also mounted on the ram for operating the tongs and is operated through a vertical shaft and a sliding lever device mounted thereon.

Referring more particularly to the accompanying drawings the invention is illustrated in connection with an electric truck 10 having a ram 12 carried by a frame 14 slidably mounted between a pair of upright guides 16. The frame 14 and ram 12 are hoisted and lowered by means of a cable 18 and a hoisting motor 20 controlled from the driving end of the truck.

The bars to be loaded are, in one form of embodiment of the invention, grasped by a pair of tongs 22 and 24 suspended from the projecting end of the ram 12 and having hooked ends 26 for insertion beneath a row or pile of bars to be lifted. The tongs are pivoted and supported on the lower end of a vertical shaft 28 extending through a hole 30 at the outer end portion of the ram. The upper end of the shaft 28 is rigidly mounted in and supported by a bevel gear 32 having a flat under face 34 resting on a saddle member 36 which in turn rests on the ram 12. Antifriction bearings are preferably provided between the face 34 and the upper face of the saddle 36 to permit the gear to be easily turned. Through this arrangement the tongs and their load of bars may be turned about the axis of the shaft 28 to any angle while suspended and be placed in position for dumping or deposition.

In rotating the gear 32 from the driving end of the truck, motion is transmitted by means of a crank 38 at the driving end, to a shaft 40, extending from the driving end to and journaled in a bearing 42 supported in a bracket 44 on the lower end of the guides 16. The motion of the shaft 40 is transmitted to a vertical shaft 46, journaled at its lower end in a thrust bearing 48 in the bracket 44 and at its upper end in a bearing 50 mounted on the upper part of the guide 16, by means of a bevel gear 52 on the lower end of the shaft 40 meshing with a bevel gear 54 on the shaft 46. A bevel gear 56 is slidably mounted on the shaft 46 and is provided with a tongue or spline 58 which slides in a longitudinal groove 60 on the shaft 46 so that the gear 56 is rotated while in any position or altitude on the shaft 46 or while in motion on the shaft. The gear 56 is rotatably supported on the frame 14 by means of a bracket 62 extending rearwardly from the frame and having a vertical hole or opening in which a collar 64 integral with the gear is mounted. From the gear 56 motion is transmitted to the gear 32 through a shaft 66 having a bevel gear 68 at one end meshing with the gear 56 and a bevel gear 70 at the opposite end meshing with the gear 32. The shaft 66 is journaled and supported at one end in bearings 72 in the frame 14 and at the opposite in a bracket 74 mounted on the upper surface of the ram 12.

In loading a group of bars the ram 12 is lowered until the hooks 26 are caught under a pile of bars, the ram is then elevated carrying with it the load of bars and the truck is run to bring the load into position to be dumped or unloaded. During the travel of the truck the tongs may be rotated or turned to any suitable position by turning the crank 38 and transmitting the turning movement through the shafts 40, 46 and 66 to the tong supporting shaft 28. The ram may then be lowered and the tongs released.

The tongs 22 and 24 are caused to spread and release their load by forcing a plate 76 slidably mounted on the shaft 28 downwardly against the upper ends 78 and 80 of the tongs 22 and 24. This is accomplished by means of a pair of toggles between the upper face of the plate 76 and the saddle 36, each of which is formed by a pair of levers 82 and 84 pivoted to each other at 86 and at their opposite ends to the plate 76 and the saddle 36, respectively. By forcing the pivot 86 in a direction to bring the levers into alignment the plate is forced downwardly with sufficient force to cause the tongs to open. The pivot 86 is moved to straighten or release the toggle by a sliding bar connection carried by the ram 12 and having a sliding connection to the operating or driving end of the truck.

The portion of this release mechanism carried by the ram 12 comprises a sliding link 88 riding on the upper surface of the ram and having a pair of arms 90 and 92 extending on opposite sides of the ram to a pivotal connection with the pivot 86. An upwardly extending lug 94 of the link 88 is connected to a sliding operating rod 96 the other end of which passes through supporting openings 98 in the frame 14 of the ram.

The end of the rod projecting through the openings 98 is connected to an arm 100 slidably mounted on a vertical shaft 102 mounted at its upper end in a bearing 104 at the top cross piece of the guides 16 and at its lower end in a bearing 106 in the bracket 44. The shaft 102 is provided with a longitudinal groove 108 in which slides a tongue 110 of the arm 100 as the ram and with it the rod 96 are raised and lowered, thus permitting the disengaging mechanism to ride freely with the ram and be at all times under the control of the shaft 102.

The rotation of the shaft 102 is controlled from the operating or driving end of the vehicle by means of a rod 112 pivoted at one end to a crank arm 114 rigidly mounted to the shaft 102 out of the reach of the arm 100, and extending to within the reach of an operator at the driving end of the truck. By moving the rod 112 in the proper direction the shaft 102 and arm 100 are rotated to slide the rod 96 and link 88 to straighten the toggle and release the tongs.

To spread the tongs 22 and 24, the supporting rod 28 may be shifted upwardly relative to the plate 76. For this purpose, the rod or shaft 28 is extended upwardly above the upper face of the gear 32 and is provided at its upper end with an integral collar 111, against the lower face of which bears the end of the horizontal arm of a bell crank lever 113, pivoted on ears 115 projecting upwardly from the bracket 74. The bell crank lever 113 is tilted to lift the shaft 28 by means of a chain or rod 117 pivoted to its upwardly extending arm and extending to the driving end of the truck, as clearly indicated in Fig. 1ª.

In place of the tong device described above, a chain arrangement shown in Figs. 7 and 8 may be used. In this case a cross bar 116 is attached to the lower end of the vertical rod 28 and to each end of the cross bar is attached a pair of chains 118 and 120. To the lower ends of each pair of chains is fastened a transverse bar 122 which may be inserted beneath the ends of a lower layer of bars. This arrangement permits a row of bars in spaced relation to be lifted and carried in a manner which would be difficult or impossible with tongs.

In loading with this apparatus the truck is driven to a position in which the end of the ram is directly over the industrial truck and the ram is then lowered to a position in which a load of bars, ingots or other masses may be taken up by the tongs or the chains and bar, whichever may be most convenient for the purpose. The ram is then raised and the truck run into the car, bringing the end of the ram to the place where the bars are to be deposited. The load of bars is then swung to the position in which the bars are to be placed and the ram lowered. This method permits of great flexibility since the truck may be placed on a platform level with the floor of the car and lift the loads of bars from an industrial truck on a track at a lower level or the truck may take its load when at the level of the industrial car and run into the railroad car on a suitable ramp.

As changes of construction could be made within the scope of my invention, it is intended that all matter contained in the above description or shown in the accompanying drawings be interpreted as illustrative and not in a limiting sense.

Having described the invention, what I claim and desire to secure by Letters Patent is:

1. Apparatus of the type described which comprises, a truck having a ram projecting therefrom, a saddle member resting and supported on the upper surface of said ram, a shaft extending vertically through said saddle member and ram, a load carrying means on said shaft, and means for supporting and rotating said vertical shaft on said saddle member.

2. Apparatus of the type described which comprises, a truck having a ram projecting therefrom, a saddle member resting and supported on the upper surface of said ram, a vertical shaft passing through said saddle member and ram and supported on said saddle, load carrying means carried by said shaft, and means for rotating said shaft on said saddle member.

3. Apparatus of the type described which comprises, a truck having a projecting ram, a saddle member resting and supported on the upper surface of said ram, a bevel gear supported on said saddle, a vertical shaft extending through said saddle and supported by said bevel gear, a load carrying means on said shaft, and means for rotating said bevel gear from the driving end of said truck.

4. Apparatus of the type described which comprises, a truck having a projecting ram, a saddle member supported on said ram, a bevel gear supported on said saddle member, a load carrying means carried and rotated by said bevel gear, a vertical shaft adjacent the truck end of said ram, a bevel gear slidably keyed to said vertical shaft and movable with said ram, a horizontal shaft having gears meshing with the saddle gear and the slidable gear and means for rotating said vertical shaft from the driving end of said truck.

5. Apparatus of the type described which comprises, a truck having a projecting ram, a saddle member supported on said ram, a bevel gear supported on said saddle member, a load carrying means carried and rotated by said bevel gear, a vertical shaft adjacent the truck end of said ram, a bevel gear slidably keyed to said vertical shaft, and a horizontal shaft carried by said ram and having gears meshing with said slidable gear and said gear mounted on said ram.

6. Apparatus of the type described which comprises, a truck having a projecting ram, a load carrying means mounted on said ram and rotatable about a vertical axis, a bevel gear for rotating said load carrying device, a vertical shaft at the truck end of said ram, a gear carried by said ram and slidably keyed on said vertical shaft, and a horizontal shaft on said ram having gears meshing with said slidable gear and with said load rotating gear.

7. Apparatus of the type described which comprises, a truck having a projecting ram, a saddle member mounted on said ram, a vertical shaft rotatably mounted on said saddle member, a pair of tongs pivoted at the lower end of said vertical shaft and having ends projecting upwardly above said pivotal point, a horizontal plate slidably mounted on said vertical shaft, and a toggle between said saddle member and said horizontal plate.

8. Apparatus of the type described which comprises, a truck having a projecting ram, a vertical shaft on the projecting portion of said ram, a pair of tongs pivoted on the depending portion of said shaft and having upwardly extending ends, a horizontal plate slidably mounted on said vertical shaft, a toggle between said plate and said saddle member, and means extending to the driving end of the truck for straightening said toggle.

9. Apparatus of the type described which comprises, a truck having a projecting ram, a pair of tongs suspended from the projecting portion of said ram and having portions of their arms extending upwardly from their pivotal point, a horizontal plate above said upwardly projecting portions, and a toggle means supported from said ram and exerting pressure on the upper surface of said plate, and means operated from the driving end of said truck for operating said toggle.

10. Apparatus of the type described which comprises, a truck having a projecting ram, a pair of tongs mounted on said ram, a toggle means for opening said tongs, a rod carried by said ram for operating said toggle, a vertical shaft, a sliding arm splined thereto and connected to said toggle operating rod, an arm mounted on said vertical shaft and a rod extending from said arm to the driving end of said truck.

11. Apparatus of the type described which comprises, a saddle member adapted to be mounted on the ram of a truck, a vertical shaft extending through said saddle member, a gear resting on said saddle member and supporting said shaft, a pair of tongs pivoted on said shaft, a horizontal plate mounted to open said tongs when depressed and a toggle between said plate and said saddle member for depressing said plate.

12. A device of the type described which comprises, a rotatable supporting member, a pair of tongs pivotally mounted on said supporting member, the upper ends of the tongs projecting above their pivotal support on said member, a non-rotating plate above the ends of said tongs, and toggle means for pressing said plate downwardly on the upper ends of said tongs to spread them.

13. A device of the type described which comprises, a rotatable supporting member, a pair of tongs pivotally mounted on said supporting member, the upper ends of the tongs projecting above their pivotal support on said member, a plate above the ends of said tongs, and toggle means for pressing said plate downwardly on the upper ends of said tongs to spread them, said plate being effective to spread said tongs in any position of rotation on their vertical axis of rotation.

ALEXANDER W. CARROLL.